US008790212B2

(12) United States Patent
Davis et al.

(10) Patent No.: US 8,790,212 B2
(45) Date of Patent: Jul. 29, 2014

(54) PLANETARY CLUTCH ASSEMBLY, FOR A TRANSMISSION, WITH A COMMON ACTUATOR FOR TWO CLUTCHES

(75) Inventors: Michael C. Davis, Sterling, OH (US); Todd J. Sturgin, Shreve, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 239 days.

(21) Appl. No.: 13/397,073

(22) Filed: Feb. 15, 2012

(65) Prior Publication Data

US 2012/0214639 A1     Aug. 23, 2012

Related U.S. Application Data

(60) Provisional application No. 61/445,380, filed on Feb. 22, 2011.

(51) Int. Cl.
    *F16D 21/06*      (2006.01)

(52) U.S. Cl.
    USPC .......................... 475/331; 475/269; 192/48.91

(58) Field of Classification Search
    USPC ......... 475/269, 296, 331, 271–292, 320, 321, 475/322; 192/48.91, 99 S
See application file for complete search history.

(56) References Cited

U.S. PATENT DOCUMENTS

| | | | |
|---|---|---|---|
| 2,225,939 A | 12/1940 | Baer | |
| 3,738,461 A | 6/1973 | Brooks et al. | |
| 4,721,194 A * | 1/1988 | Frost | 192/48.91 |
| 5,462,147 A * | 10/1995 | Sherman | 192/18 A |
| 5,531,651 A * | 7/1996 | Yang | 475/12 |
| 6,135,259 A * | 10/2000 | Forster | 192/221.1 |
| 6,854,577 B2 * | 2/2005 | Ruth | 192/46 |
| 6,949,042 B2 * | 9/2005 | Eymuller et al. | 475/140 |
| 7,036,645 B2 * | 5/2006 | Sowul et al. | 192/48.91 |
| 8,221,279 B2 * | 7/2012 | Reed et al. | 475/269 |
| 8,475,325 B2 * | 7/2013 | Janson et al. | 475/331 |
| 2003/0087720 A1 * | 5/2003 | Lepelletier | 475/282 |
| 2005/0139442 A1 * | 6/2005 | Agner et al. | 192/48.8 |
| 2013/0053207 A1 * | 2/2013 | Wilton et al. | 475/276 |

* cited by examiner

*Primary Examiner* — Roger Pang
(74) *Attorney, Agent, or Firm* — Simpson & Simpson, PLLC

(57) ABSTRACT

A planetary clutch assembly, including: a first input shaft; an output shaft; a planetary gear set connected to the first input shaft and including a ring gear and a planet carrier; first and second clutches; and an actuator. The planet carrier is connected to the first clutch so that the planet carrier and a portion of the first clutch rotate in unison. The ring gear is grounded to a case for the transmission. The first and second clutches are connected to the output shaft so that the output shaft and a portion of the first and second clutches rotate in unison.

26 Claims, 4 Drawing Sheets

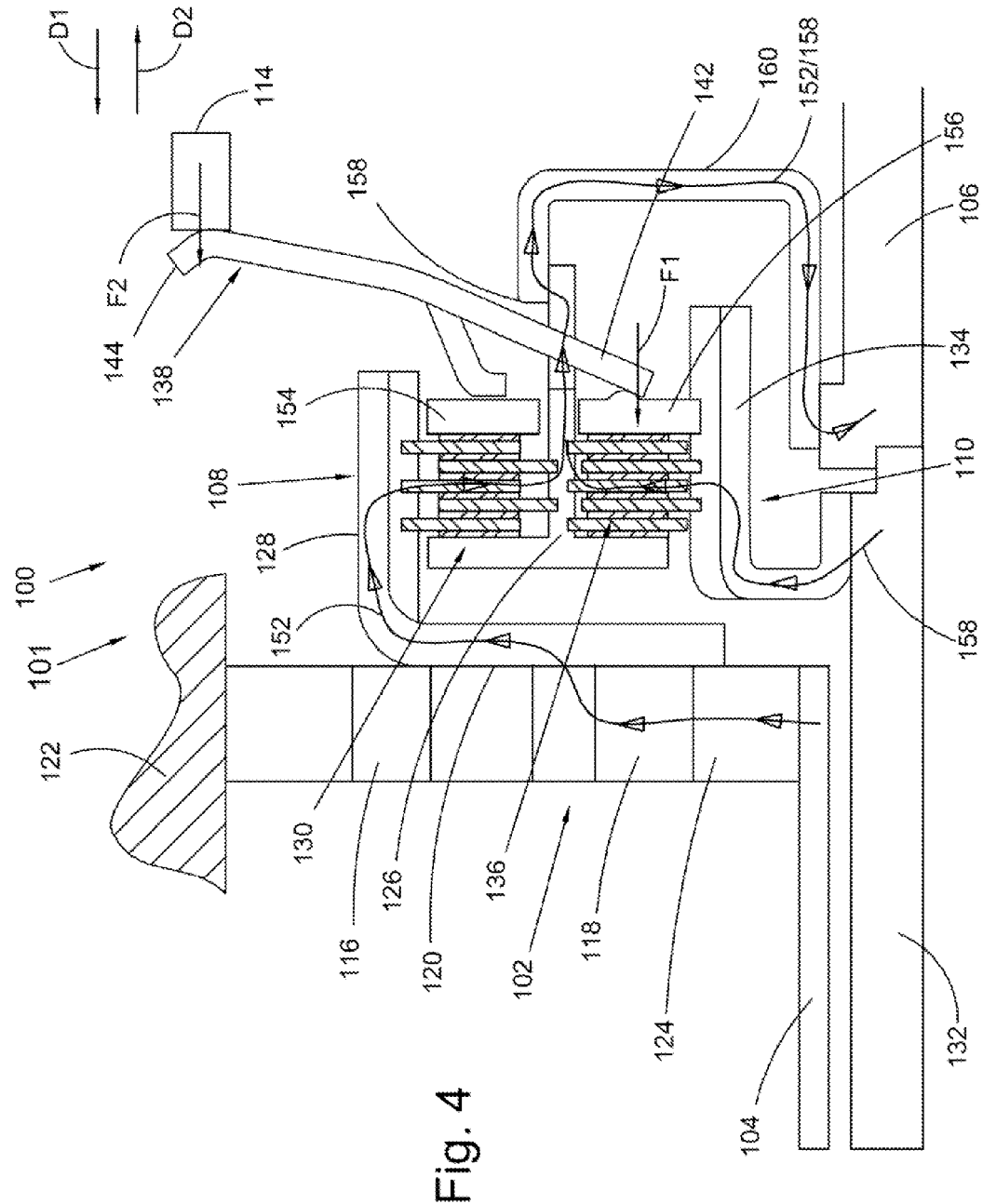

PLANETARY CLUTCH ASSEMBLY, FOR A TRANSMISSION, WITH A COMMON ACTUATOR FOR TWO CLUTCHES

CROSS-REFERENCE TO RELATED APPLICATIONS

This application claims the benefit under 35 U.S.C. §119(e) of U.S. Provisional Application No. 61/445,380 filed Feb. 22, 2011 and is incorporated herein by reference in its entirety.

TECHNICAL FIELD

The present disclosure relates to a clutch assembly, in particular, a planetary clutch assembly in a transmission, and more particularly for a transmission for a hybrid vehicle. A single actuator is used to operate the clutch. One of the clutches closes for failure of the actuator.

BACKGROUND

It is known to use hydraulic pressure systems to operate pistons to engage clutches in a transmission. Hydraulic pressure systems may entail undesirably high power requirements, since pressure must be continuously applied to the piston to keep the clutches engaged.

SUMMARY

According to aspects illustrated herein, there is provided a planetary clutch assembly for a transmission, including: a first input shaft; an output shaft; a planetary gear set connected to the first input shaft and including a ring gear and a planet carrier; and first and second clutches. The planet carrier is connected to the first clutch so that the planet carrier and a portion of the first clutch rotate in unison. The ring gear is grounded to a case for the transmission. The first and second clutches are connected to the output shaft so that the output shaft and a portion of the first and second clutches rotate in unison.

According to aspects illustrated herein, there is provided a planetary clutch assembly for a transmission, including: first and second clutches including a common carrier engaged with a first plurality of clutch plates for the first clutch and a second plurality of clutch plates for the second clutch; a planetary gear set including a first portion connected to the first clutch and a second portion grounded to a case for the transmission; a first input shaft connected to the planetary gear set; a second input shaft connected to the second clutch; an output shaft connected to the common carrier; and an actuator arranged to open and close the first and second clutches.

According to aspects illustrated herein, there is provided a planetary clutch assembly for a transmission, including: first and second input shafts; an output shaft; a planetary gear set connected to the first input shaft; a first clutch connected to a portion of the planetary gear set so that the first clutch and the portion of planetary gear set rotate in unison; a second clutch connected to the second input shaft so that a portion of the second clutch and the second input shaft rotate in unison; and an actuation assembly including a spring engageable with the first and second clutches. In a first configuration: the first clutch is open; the spring is arranged to close the second clutch; and a first torque path is formed from the second input shaft to the output shaft through the second clutch and a portion of the first clutch. In a second configuration the actuator is arranged to displace the spring so that: the first clutch is closed; the second clutch is open; and a second torque path is formed from the first input shaft to the output shaft through the first clutch and a portion of the second clutch.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
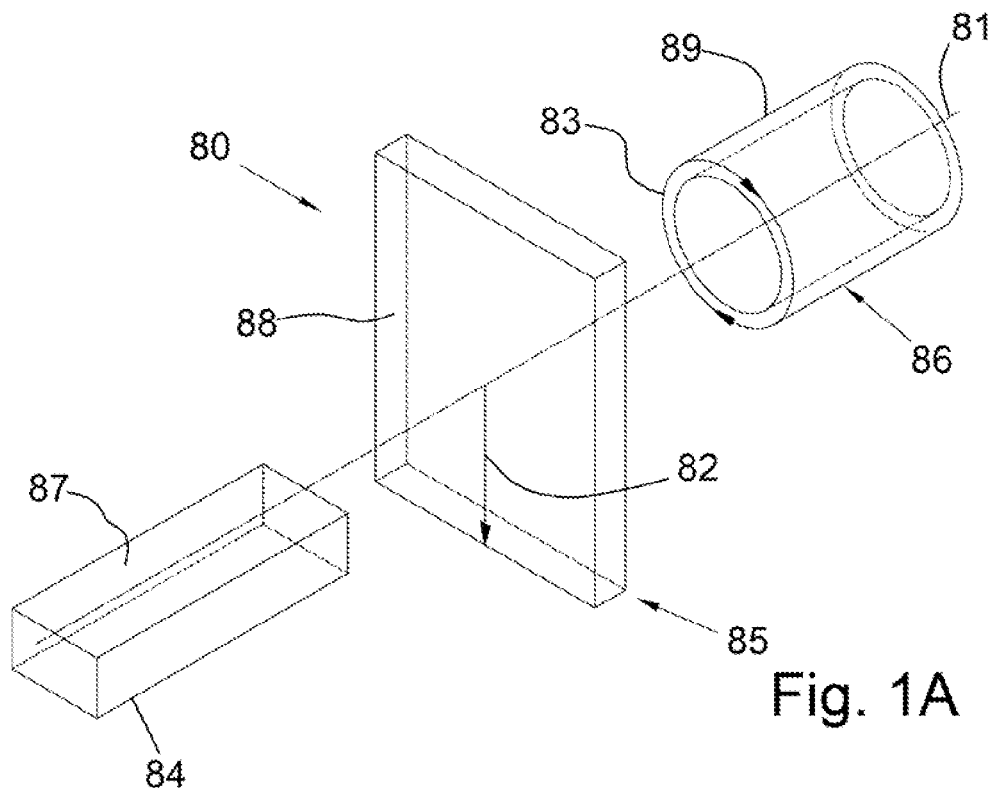
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
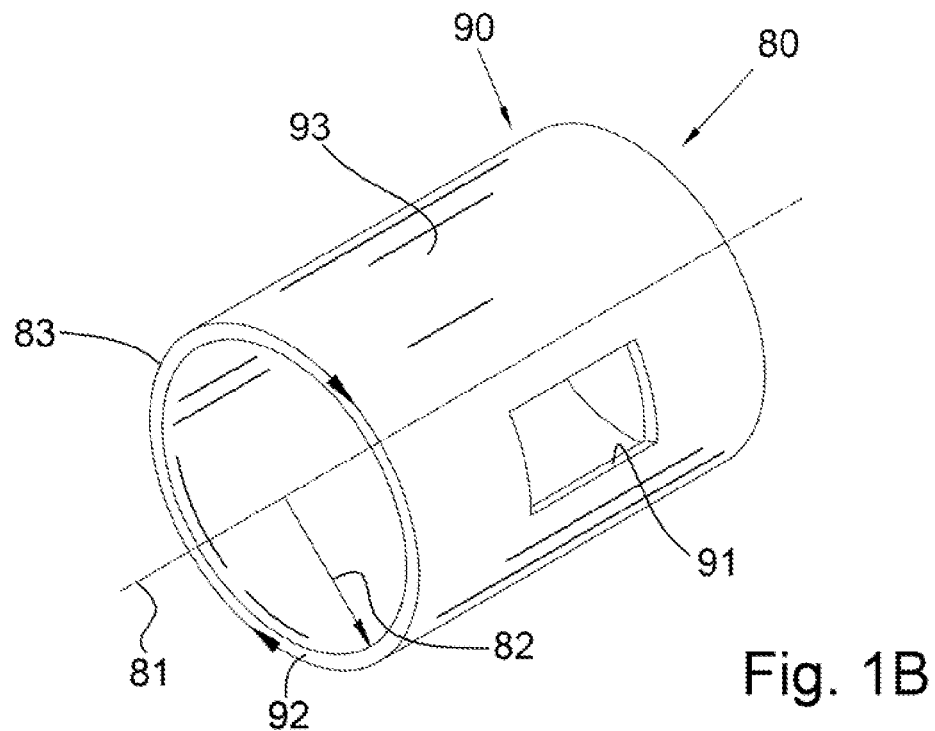
FIG. 1B is a perspective view of an object in the cylindrical coordinate system of FIG. 1A demonstrating spatial terminology used in the present application; and, FIG. 2 is a schematic cross-section of a portion of a planetary clutch assembly for a transmission with a planetary gear set and a common actuator for two clutches, in a first configuration.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
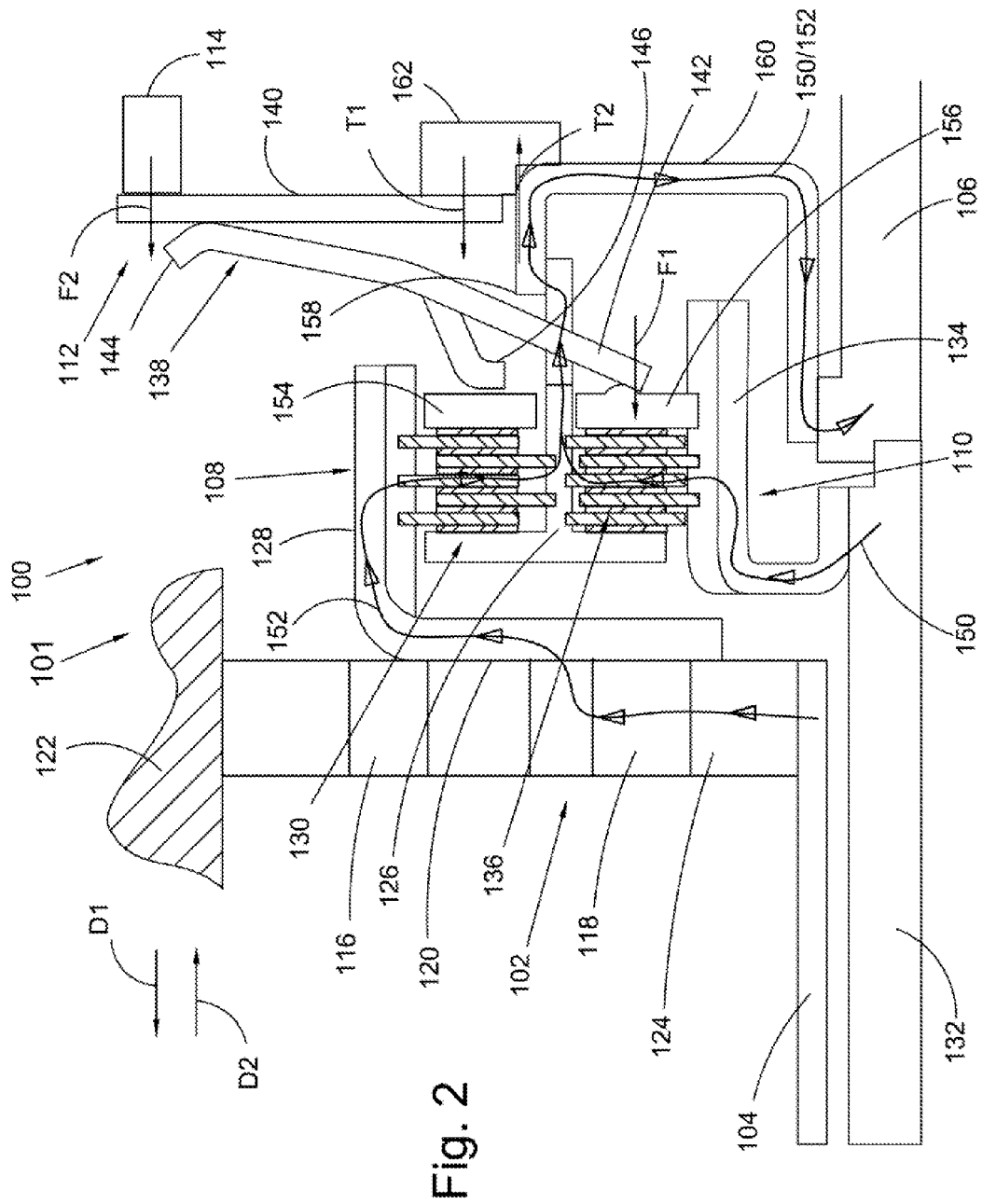

FIG. 2 is a schematic cross-section of a portion of planetary clutch assembly 100 for transmission 101 with planetary gear set 102 and a common actuator for two clutches, in a first configuration.

Figure 3:
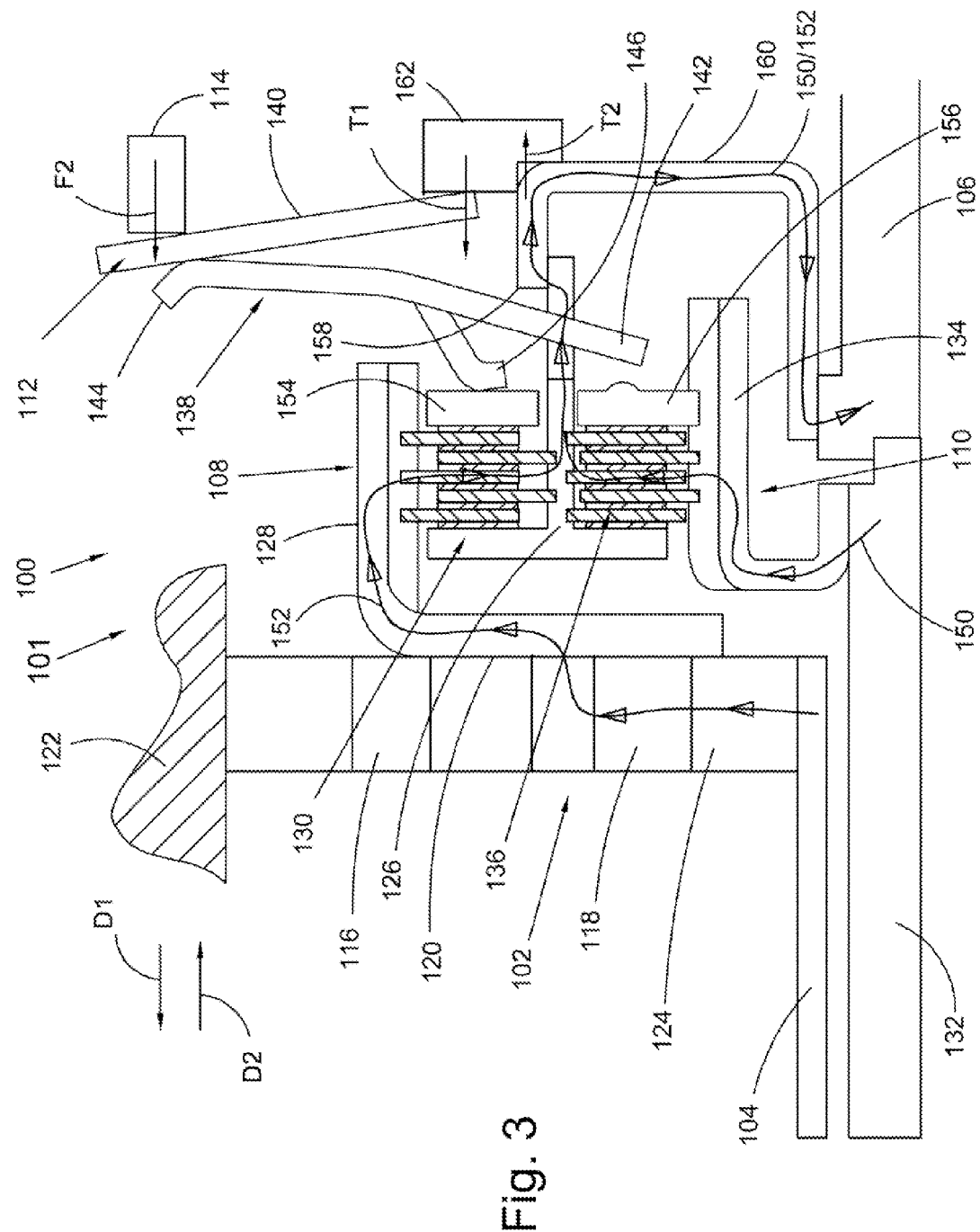
FIG. 3 is a schematic cross-section of the planetary clutch assembly shown in FIG. 2 in a second configuration; and, FIG. 4 is a schematic cross-section of a portion of a planetary clutch assembly for a transmission with a planetary gear set and a pre-loaded spring.

FIG. 3 is a schematic cross-section of planetary clutch assembly 100 shown in FIG. 2 in a second configuration. The following should be viewed in light of FIGS. 2 and 3. Transmission 101 includes input shaft 104 and output shaft 106. Assembly 100 includes clutch 108, clutch 110, and actuator assembly 112 with actuator 114. Actuator 114 can be any actuator known in the art including, but not limited to, an electro-mechanical actuator, a pneumatic actuator, a vacuum based actuator, or an oil driven (hydraulic) actuator. In an example embodiment, the actuator is an electro-mechanical actuator.

The planetary gear set includes ring gear 116, planet gears 118, and planet carrier 120. The planet carrier is connected to clutch 108 so that the planet carrier and a portion of clutch 108 rotate in unison. By "rotate in unison" we mean that the planet carrier and the portion of clutch 108 are connected so that if one of the planet carrier or the portion of clutch 108 rotates, the other of the planet carrier or the portion of clutch 108 must necessarily rotate. That is, rotation of one of the planet carrier or the portion of clutch 108 is not possible without rotation of the other of the planet carrier or the portion of clutch 108. Note that axial movement between components rotating in unison may be possible. The preceding explanation is applicable to the use of "rotate in unison" in the discussion that follows. A portion of the planetary gear set is grounded to case 122 for the transmission. In an example embodiment, the ring gear is grounded to the case. Clutch 110 is connected to the output shaft so that a portion of clutch 110 and the output shaft rotate in unison.

The planetary gear set includes sun gear 124 connected to input shaft 104 so that the sun gear and the input shaft 104 rotate in unison. Clutch 108 includes common carrier 126, outer carrier 128, disposed radially outward from the common carrier, and a plurality of clutch plates 130 disposed radially between the common and outer carriers. In an example embodiment, the planet carrier is connected to the outer carrier so that the planet carrier and the outer carrier rotate in unison.

Transmission 101 includes input shaft 132. Clutch 110 includes the common carrier, inner carrier 134 disposed radially inward of the common carrier, and a plurality of clutch plates 136 disposed radially between the inner and common carriers. In an example embodiment, the inner carrier is connected to input shaft 132 so that the inner carrier and the input shaft rotate in unison.

In an example embodiment, the actuator assembly includes spring 138 and actuator plate 140 displaceable by the actuator. In an example embodiment, the actuator is arranged to maintain the actuator plate in a first position or configuration, for example, the position or configuration shown in FIG. 2 so that the actuator plate is in contact with the spring, clutch 108 is open, and portion 142 of the spring is arranged to clamp clutch plates 136 to close clutch 110. Starting from the configuration shown in FIG. 2, the actuator is arranged to axially displace at least a portion of the actuator plate, for example, in axial direction D1, to a second position or configuration, for example, the position or configuration shown in FIG. 3, to displace portion 144 of the spring, for example, in direction D1. As a result of the displacement of portion 144, portion 146 of the spring clamps clutch plates 130, portion 142 of the spring axially displaces, for example, in direction D2, opposite direction D1, to open clutch 110. Functions of the actuator assembly are further described infra.

For the first position of the actuator plate, or a first configuration, for example, as shown in FIG. 2, torque path 150 is formed from input shaft 132 to the output shaft via inner carrier 134, clutch plates 136, and the common carrier. For the second position of the actuator plate, for example, as shown in FIG. 3, torque path 152 is formed from input shaft 104 to the output shaft via the sun gear, the planet gears, the planet carrier, the outer carrier, clutch plates 130, and the common carrier.

Spring 138 is installed in the transmission with a pre-load arranged to clamp clutch plates 136, for example, with portion 142, to close the second clutch. That is, the spring is pre-loaded by actuator plate 140, generating force F1 in direction D1 to close clutch 110. Stated otherwise, the spring is arranged to engage clutch 110 with force F1, or to transmit force F1 to clutch 110. In the absence of a sufficient force, generated by the actuator on the spring, the spring is arranged to close the clutch 110. However, at least a portion of actuator 114 is displaceable to generate sufficient force F2 to displace plate 140 in direction D1, against the reactive force of the spring, to the position shown in FIG. 3. For the second position or configuration of the plate, portion 144 of the spring has been displaced in direction D1 such that the spring pivots about portion 146, displacing portion 142 in direction D2 to enable clutch 110 to open.

In the event of a power failure for the actuator, the actuator is arranged such that plate 140 is positioned substantially as shown in FIG. 2, that is, the planetary clutch assembly operates in the first configuration noted above, and the plate is positioned such that the pre-loading of the spring acts to close clutch 110. That is, in the absence of force F2 from actuator 114, spring 138 is preloaded by actuator plate 140 to engage clutch 110. Thus, spring 138 enables a fail-safe condition that ensures that at least one gear of the transmission is usable, via clutch 110, in the event of a failure of the actuator.

The following provides further detail of an example configuration of planetary clutch assembly 100. In an example embodiment, clutch 108 includes apply plate 154 and clutch 110 includes apply plate 156. Advantageously, clutches 108 and 110 are operable without a piston and fluid pressure, specifically due to actuator 114. Planetary clutch assembly 100 self-contains the thrust loads associated with spring 138 through common carrier 126/160 and actuator plate 140. During the assembly of the transmission, spring 138 is pre-loaded to clutch 110 by actuator plate 140. Axial displacement of plate 140 is fixed relative to the common carrier via reaction element 162. For example, the force generated by the actuator plate to preload the spring is reacted through element 162 in direction D1 as shown by T1. Thus, thrust forces are balanced by element 162.

FIG. 4 is a schematic cross-section of a portion of planetary clutch assembly 200 with planetary gear set 102 and preloaded spring 138. The discussion regarding FIGS. 2 and 3 is applicable to FIG. 4 except as noted. In FIG. 4, spring 138 is preloaded by pivot 158 of common carrier 126 without the use of actuator plate 140 or reaction element 162. Reaction forces for the preload are self contained by the common carrier. Apply forces from the actuator to engage outer clutch 108 must be reacted elsewhere in the transmission. That is, when clutch 108 is engaged by actuator 114, the force F2 of the actuator urges the common carrier in direction D1. Therefore, transmission 101 includes an axial stop disposed on shaft 106 or 132, for example, snap ring 164 on shaft 132, to control axial displacement of the clutches.

In an example embodiment, the input shafts are independently controllable. For example, the rotation of input shaft 104 is independent of the rotation of input shaft 132. In an example embodiment, speed matching is applied to operation of clutches 108 and 110. For example, if clutch 110 is closed and it is desired to close clutch 108, for example, to shift a gear in the transmission, a rotational speed for input shaft 104 is adjusted such that a rotational speed for the outer carrier substantially matches the rotational speed for the common carrier. Then, while clutch 110 is still engaged, clutch 108 is closed. Both clutches remain closed for a relatively short period of time, smoothing the transition between gears, and clutch 110 is then opened.

Although planetary clutch assembly 100 has been shown with a particular configuration of components, it should be understood that planetary clutch assembly 100 is not limited to the particular configuration of components shown and that other configurations of components are possible.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A planetary clutch assembly for a transmission, comprising:
    a first input shaft;
    a second input shaft;
    an output shaft;
    a planetary gear set connected to the first input shaft and including a ring gear and a planet carrier; and,
    first and second clutches, wherein:
        the planet carrier is connected to the first clutch so that the planet carrier and a portion of the first clutch rotate in unison;
        the ring gear is grounded to a case for the transmission;
        the first and second clutches are connected to the output shaft so that the output shaft and a portion of the first and second clutches rotate in unison;
        the portion of the first and second clutches includes a common carrier;
        the second clutch includes an inner carrier disposed radially inward of the common carrier and a plurality of clutch plates disposed radially between the inner and common carriers; and,
        the inner carrier is connected to the second input shaft so that the inner carrier and the second input shaft rotate in unison.

2. The planetary clutch assembly of claim 1, wherein:
    the planetary gear set includes a sun gear connected to the first input shaft so that the sun gear and the first input shaft rotate in unison;
    the portion of the first and second clutches includes a common carrier;
    the first clutch includes an outer carrier disposed radially outward from the common carrier, and a plurality of clutch plates disposed radially between the common and outer carriers; and,
    the planet carrier is connected to the outer carrier so that the planet carrier and the outer carrier rotate in unison.

3. The planetary clutch assembly of claim 1, further comprising an actuator, a spring, and an actuator plate engaged with the actuator and the spring and displaceable by the actuator, wherein:
    for a first position of the actuator plate:
        the first clutch is open; and,
        a first portion of the spring is arranged to close the second clutch; and,
    the actuator is arranged to displace the actuator plate from the first position to a second position to displace a second portion of the spring such that:
        a third portion of the spring closes the first clutch; and,
        the first portion of the spring axially displaces to open the second clutch.

4. The planetary clutch assembly of claim 3, further comprising a second input shaft, wherein:
    the first clutch includes an inner carrier and an outer carrier;
    the planetary gear set includes a sun gear connected to the first input shaft;
    for the first position of the actuator and the actuator plate, a first torque path is formed from the second input shaft to the output shaft via the inner carrier, the second plurality of clutch plates, and the common carrier; and,
    for the second position of the actuator plate, a second torque path is formed from the first input shaft to the output shaft via the sun gear, the planet carrier, the outer carrier, the first plurality of clutch plates, and the common carrier.

5. The planetary clutch assembly of claim 1, further comprising:
    an actuator arranged to open and close the first and second clutches; and,
    a spring arranged to be pre-loaded by the actuator to close the second clutch.

6. The planetary clutch assembly of claim 1, further comprising a spring arranged to be pre-loaded to close the second clutch.

7. The planetary clutch assembly of claim 1, further comprising:
    an actuator arranged to open and close the first and second clutches; and,
    a spring displaceable by the actuator, wherein in the event of a power failure for the actuator, the spring is arranged to close the second clutch.

8. A planetary clutch assembly for a transmission, comprising:
    first and second clutches including a common carrier engaged with a first plurality of clutch plates for the first clutch and a second plurality of clutch plates for the second clutch;

a planetary gear set including a first portion connected to the first clutch and a second portion grounded to a case for the transmission;
a first input shaft connected to the planetary gear set;
a second input shaft connected to the second clutch;
an output shaft connected to the common carrier; and,
an actuator arranged to open and close the first and second clutches.

9. The planetary clutch assembly of claim 8, wherein:
the planetary gear set includes:
a sun gear connected to the first input shaft;
a planet carrier; and,
a ring gear;
the first portion of the planetary gear includes the planet carrier; and,
the second portion of the planetary gear set includes the ring gear.

10. The planetary clutch assembly of claim 8, wherein:
the first clutch includes an outer carrier disposed radially outward from the common carrier;
the second clutch includes an inner carrier disposed radially inward of the common carrier;
the planetary gear set is connected to the outer carrier; and,
the inner carrier is connected to the second input shaft.

11. The planetary clutch assembly of claim 8, further comprising a spring and an actuator plate in contact with the actuator and the spring, wherein:
in a first position for the actuator plate:
the first clutch is open; and,
the actuator is arranged to pre-load the spring such that a first portion of the spring closes the second clutch; and,
the actuator is arranged to displace the actuator plate from the first position to a second position so that:
a second portion of the spring closes the first clutch; and,
the first portion of the spring displaces to open the second clutch.

12. The planetary clutch assembly of claim 11, wherein:
the first clutch includes an outer carrier disposed radially outward from the common carrier;
the second clutch includes an inner carrier disposed radially inward of the common carrier;
the planetary gear set includes a sun gear connected to the first input shaft;
in the first position a first torque path is formed from the second input shaft to the output shaft via the inner carrier, the second plurality of clutch plates, and the common carrier; and,
in the second position a second torque path is formed from the first input shaft to the output shaft via the sun gear, the planet carrier, the outer carrier, the first plurality of clutch plates, and the common carrier.

13. The planetary clutch assembly of claim 11, wherein for a power failure of the actuator the spring is arranged to close the second clutch.

14. The planetary clutch assembly of claim 8, further comprising a spring, wherein:
in a first configuration of the spring:
the first clutch is open; and,
the spring is pre-loaded by contact with the common carrier such that a first portion of the spring closes the second clutch; and,
in a second configuration of the spring:
a second portion of the spring clamps the first plurality of clutch plates; and,
the first portion of the spring displaces to open the second clutch.

15. The planetary clutch assembly of claim 14, wherein:
the planetary gear set includes a sun gear connected to the first input shaft;
in the first configuration a first torque path is formed from the second input shaft to the output shaft via the inner carrier, the second plurality of clutch plates, and the common carrier; and,
in the second configuration a second torque path is formed from the first input shaft to the output shaft via the sun gear, the planet carrier, the outer carrier, the first plurality of clutch plates, and the common carrier.

16. The planetary clutch assembly of claim 14, further comprising an actuator arranged to displace at least a portion of the spring so that the first portion of the spring displaces to open the second clutch.

17. The planetary clutch assembly of claim 14, further comprising an actuator, wherein for a power failure of the actuator the spring is arranged to close the second clutch.

18. A planetary clutch assembly for a transmission, comprising:
first and second input shafts;
an output shaft;
a planetary gear set connected to the first input shaft;
a first clutch connected to a portion of the planetary gear set so that the first clutch and the portion of planetary gear set rotate in unison;
a second clutch connected to the second input shaft so that a portion of the second clutch and the second input shaft rotate in unison; and,
an actuation assembly including a spring engageable with the first and second clutches, wherein:
in a first configuration:
the first clutch is open;
the spring is arranged to close the second clutch; and,
a first torque path is formed from the second input shaft to the output shaft through the second clutch and a portion of the first clutch;
in a second configuration a portion of the spring is displaceable so that:
the first clutch is closed;
the second clutch is open; and,
a second torque path is formed from the first input shaft to the output shaft through the first clutch and a portion of the second clutch.

19. The planetary clutch assembly of claim 18, wherein:
the first clutch includes a common carrier, an outer carrier disposed radially outward from the common carrier, and a first plurality of clutch plates disposed radially between the common and outer carriers;
the second clutch includes the common carrier, an inner carrier disposed radially inward of the common carrier, and a second plurality of clutch plates disposed radially between the inner and outer carriers; and,
the first and second torque paths pass through the common carrier.

20. The planetary clutch assembly of claim 18, wherein:
the planetary gear set includes:
a sun gear directly connected to the first input shaft;
a planet carrier; and,
a ring gear grounded to a case for the transmission; and,
the portion of the planetary gear set includes the planet carrier.

21. The planetary clutch assembly of claim 20, wherein:
the first clutch includes a common carrier, an outer carrier disposed radially outward from the common carrier, and a first plurality of clutch plates disposed radially between the common and outer carriers;

the second clutch includes the common carrier, an inner carrier disposed radially inward of the common carrier, and a second plurality of clutch plates disposed radially between the inner and outer carriers;
the planet carrier is connected to the outer carrier; and,
the portion of the second clutch includes the inner carrier.

22. The planetary clutch assembly of claim 18, wherein:
the actuation assembly includes an actuator;
the spring is preloaded by the actuator to generate a first force sufficient to close the second clutch;
in the first configuration, the first force is arranged to close the second clutch;
in the second configuration, the actuator is arranged to apply a second force to the portion of the spring so that the first force is removed from the second clutch.

23. The planetary clutch assembly of claim 22, wherein for a power failure of the actuator, the planetary clutch assembly is arranged to operate in the first configuration.

24. The planetary clutch assembly of claim 18, wherein:
the spring is preloaded by contact with the common carrier to generate a first force sufficient to close the second clutch;
in the first configuration, the first force is arranged to close the second clutch;
in the second configuration, the portion of the spring is displaceable in response to a second force.

25. The planetary clutch assembly of claim 24, wherein the actuation assembly includes an actuator arranged to apply the second force.

26. The planetary clutch assembly of claim 24, wherein:
the actuation assembly includes an actuator arranged to apply the second force; and,
for a power failure of the actuator, the planetary clutch assembly is arranged to operate in the first configuration.

* * * * *